No. 733,082. Patented July 7, 1903.

UNITED STATES PATENT OFFICE.

KEIZO SAKURAI, OF SAN FRANCISCO, CALIFORNIA.

COMPOUND FOR ABRADING-TOOLS.

SPECIFICATION forming part of Letters Patent No. 733,082, dated July 7, 1903.

Application filed November 3, 1902. Serial No. 129,852. (Specimens.)

*To all whom it may concern:*

Be it known that I, KEIZO SAKURAI, a citizen of Japan, residing in the city and county of San Francisco, State of California, have invented an Improvement in Compounds for Abrading-Tools; and I hereby declare the following to be a full, clear, and exact description of the same.

My invention relates to the production of an artificial compound for use as a substitute for emery, carborundum, and the like in the manufacture of grinding-wheels and other abrading or polishing tools. Its object is to provide an abrasive compound possessing the following qualities: one which will possess great hardness and durability and which will not suffer deterioration through the generation of heat by friction, which will be homogeneous throughout and will not become worn unevenly, which will have an enhanced cutting power and which will not be liable to glaze or to have the pores clogged by the dust from the article being operated upon.

In practice I take either granulated emery or a suitable silicate, as garnet or quartz or granite of a uniform grade of fineness, add thereto a certain proportion of minium of red lead and moisten with a solution of silicate of soda or of potassium, commonly known as "water-glass," to form a paste. Under some conditions a small quantity of finely-powdered quartz may be profitably added and under certain conditions from one-half to one per cent. of borax, niter, or sassolin may be incorporated in the mixture. The powdered quartz would ordinarily be employed in conjunction with emery as a vitrifiable binder. The use of borax, niter, or sassolin would be to give homogeneity to the mass in firing.

Representative formulæ for producing a grinding-tool of ordinary hardness would be as follows:

First. Emery, one hundred pounds; $Pb_3O_4$, (red lead,) 5.85 pounds; $SiO_2$, (powdered quartz,) 8.75 pounds; $Na_4SiO_3$, (water glass,) (specific gravity, 1.75,) 5.85 pounds.

Second. Garnet, one hundred pounds; $Pb_3O_4$, five pounds; $SiO_2$, 8.33 pounds; $Na_4SiO_3$, (specific gravity, 1.75,) five pounds;

Third. Quartz, one hundred pounds; $Pb_3O_4$, 13.75 pounds; $Na_4SiO_3$, (specific gravity, 1.75,) 8.25 pounds.

The proportions of red lead, &c., would vary from the above according as a greater or less degree of hardness is desirable. For instance, the extremes of hardness would be illustrated as follows, the larger amounts representing the hardest form of compound: $Pb_3O_4$, from three to 6.6 pounds per hundredweight of garnet; $SiO_2$, from five to eleven pounds per hundredweight of garnet; $Sa_4SiO_3$, from three to 6.6 pounds per hundredweight of garnet.

The paste after having been kneaded into a uniform consistency is molded into the required form of the article to be manufactured. It is then gradually dried at a temperature of about 120°. When thoroughly dried, it is placed in a suitable oven or kiln and brought to red heat, at which it is kept until the particles have been cemented together into a hard, coherent, homogeneous, gritty mass. The heat usually required is only about 800° or 900° centigrade. The length of time necessary to effect proper vitrification depends on the size of the article—for example, a three-inch wheel half an inch thick would require about four hours. For the baking operation a furnace or oven of any suitable design may be used—as, for instance, an ordinary pottery kiln.

It is important that the various matters of drying, heating, and cooling should each be effected gradually, so as to prevent cracking or other damage.

The red lead when made into a paste has the quality of setting quickly, rendering it desirable as a binder for that reason. Moreover, its presence seems to neutralize the tendency of the other materials—*i. e.*, emery or quartz, &c., and water-glass—when combined alone to expand or contract too rapidly.

It has been found that grinding-wheels and other abrading and polishing tools made by the above process possess great durability and structural uniformity.

Having thus described my invention, what I claim, and desire to secure by Letters Patent, is—

1. A new article of manufacture comprising in combination an abrasive substance in comminutive form, a silicate of an alkali metal, and a suitable binder whereby the undue tendency of the other two elements to expand or contract unduly when combined alone and subjected to red heat, is obviated.

2. A new article of manufacture comprising in combination an abrasive crystalline substance, a metallic silicate and a silicate of an alkali metal, in about the proportions herein indicated and having the properties herein specified.

In witness whereof I have hereunto set my hand.

KEIZO SAKURAI.

Witnesses:
   S. H. NOURSE,
   S. K. MITSUSE.